US006740701B2

(12) United States Patent
Chacko

(10) Patent No.: US 6,740,701 B2

(45) Date of Patent: May 25, 2004

(54) RESISTIVE FILM

(75) Inventor: Antony P. Chacko, Granger, IN (US)

(73) Assignee: CTS Corporation, Elkhart, IN (US)

( * ) Notice: Subject to any disclaimer, the term of this patent is extended or adjusted under 35 U.S.C. 154(b) by 234 days.

(21) Appl. No.: 10/047,147

(22) Filed: Jan. 14, 2002

(65) Prior Publication Data

US 2003/0146418 A1 Aug. 7, 2003

Related U.S. Application Data

(63) Continuation-in-part of application No. 09/999,625, filed on Oct. 25, 2001.

(51) Int. Cl.[7] ............................ C08K 3/04; C08K 3/36

(52) U.S. Cl. .................... 524/492; 524/493; 524/499.5; 524/496; 338/73; 338/74; 338/160

(58) Field of Search ................................ 524/492–493, 524/495–496; 338/73–74, 160

(56) References Cited

U.S. PATENT DOCUMENTS 3,870,987 A * 3/1975 Wiley et al. ................ 338/214
4,313,101 A * 1/1982 Bloore et al. ............... 338/212
4,621,249 A * 11/1986 Uchikawa et al. ............ 338/35
5,035,836 A * 7/1991 Gardos et al. .............. 252/511
5,111,178 A 5/1992 Bosze ........................ 338/160
5,318,823 A * 6/1994 Utsumi et al. .............. 428/143
5,430,087 A * 7/1995 Carlson et al. ............. 524/496
5,677,367 A * 10/1997 Savin ......................... 523/219
5,781,100 A 7/1998 Komatsu .................... 338/252
5,883,173 A 3/1999 Elspass ...................... 524/446
5,955,936 A * 9/1999 Shaw et al. ............... 338/22 R
6,060,549 A 5/2000 Li .............................. 524/445
6,172,595 B1 1/2001 Komatsu .................... 338/160
6,184,280 B1 2/2001 Shibuta ...................... 524/405
6,380,294 B1 * 4/2002 Babinec et al. ............. 524/440
6,512,039 B1 * 1/2003 Mowrey ..................... 524/492

* cited by examiner

*Primary Examiner*—Peter Szekely
(74) *Attorney, Agent, or Firm*—Mark Bourgeois

(57) ABSTRACT

A resistive film for use in a potentiometer. The film is in contact with a movable wiper. The film includes a cured polymer resin and a cured thermosetting resin. Conductive particles of carbon black and graphite are dispersed in the film. The conductive particles cause the resins to be electrically resistive. Carbon nanoparticles are also dispersed in the film. The nanoparticles increase the wear resistance of the resistive film and reduce electrical noise as the wiper moves across the film.

13 Claims, 1 Drawing Sheet

RESISTIVE FILM

CROSS REFERENCE TO RELATED AND CO-PENDING APPLICATIONS

This application is a continuation in part of U.S. patent application Ser. No. 09/999,625 filed Oct. 25, 2001 and titled, "Resistive Nanocomposite Compositions", and is herein incorporated by reference in entirety.

BACKGROUND OF THE INVENTION

1. Field of the Invention

This invention generally relates to polymer resistors for use in potentiometers. In particular, the invention is directed to a resistive film that contains nanomaterials.

2. Description of the Related Art

Electrically resistive polymer thick film compositions have numerous applications. Polymer thick film (PTF) resistive compositions are screenable pastes, which are used to form resistive elements in electronic applications. Such compositions contain conductive filler material dispersed in polymeric resins, which remain an integral part of the final composition after processing.

Resistive compositions are used as resistive elements in variable resistors, potentiometers, and position sensor applications. A resistive element is in most cases printed over a conductive element, which acts as the collector element. In position sensing applications, a metallic wiper slides over the resistive element. The wiper can slide back and forth for several million cycles over the collector and resistive elements during the lifetime of the electronic component. For accurate position sensing, the wiper should give continuous electrical output throughout the life of the sensor. The durability of these position-sensing elements depends on the mechanical properties of both the resistor and the conductive film. The polymer thick films tend to wearout after several million cycles of sliding with a metallic contactor moving over the elements at extreme temperature conditions such as in an automotive engine compartment. Polymer resistive and conductive compositions having excellent mechanical properties and wear resistance are required for these applications.

In addition to good mechanical properties, these materials should also have good thermal properties. Polymer thick films show a decrease in storage modulus as temperature is increased. A sharp decrease in mechanical properties is observed near the glass transition temperature. In addition to loss in modulus, these materials also tend to show an increase in coefficient of thermal expansion, which increases significantly above the glass transition temperature. A position sensor is exposed to high temperatures in an engine compartment. At these temperatures, the elements show a high rate of wear due to a decrease in modulus properties. In addition to the surrounding temperature, a still higher temperature is observed at the interface between the metallic wiper and the element surface due to frictional heating. In some cases these temperatures can approach the glass transition temperature (Tg) of the material and can cause loss of the mechanical properties, which adversely affect the signal output.

A prior art resistor composition is as follows:

Prior Art Composition

| Component | Weight (%) |
|---|---|
| Polyamide imide | 21.0 |
| Carbon black | 5.3 |
| N-methyl pyrrolidone | 73.7 |

One way to increase the mechanical properties of the film is to incorporate fillers such as short fibers into the films. The presence of fibers with a relatively large dimension creates electrically heterogeneous surface. This results in non-linear electrical output in contact sensor applications. Even when the fibers are in micron dimension, the surface can be electrically and mechanically heterogeneous. A dither motion at high frequency on a surface region where these fibers are absent can create large wear. Another problem occurs when fibers greater than 10 volume percentage are used. This can significantly wear the metallic contactor. This wear is accelerated if these fibers are protruded from the surface. Therefore, there is a current unmet need for a resistive film with enhanced mechanical and thermal properties with homogeneous surface electrical characteristics

SUMMARY

A resistive film for use in a potentiometer. The film is in contact with a movable wiper. The film includes a cured polymer resin and a cured thermosetting resin. Conductive particles of carbon black and graphite are dispersed in the film. The conductive particles cause the resins to be electrically conductive. Nanoparticles are also dispersed in the film. The nanoparticles increase the wear resistance of the resistive film as the wiper moves across the film.

Figure 1:
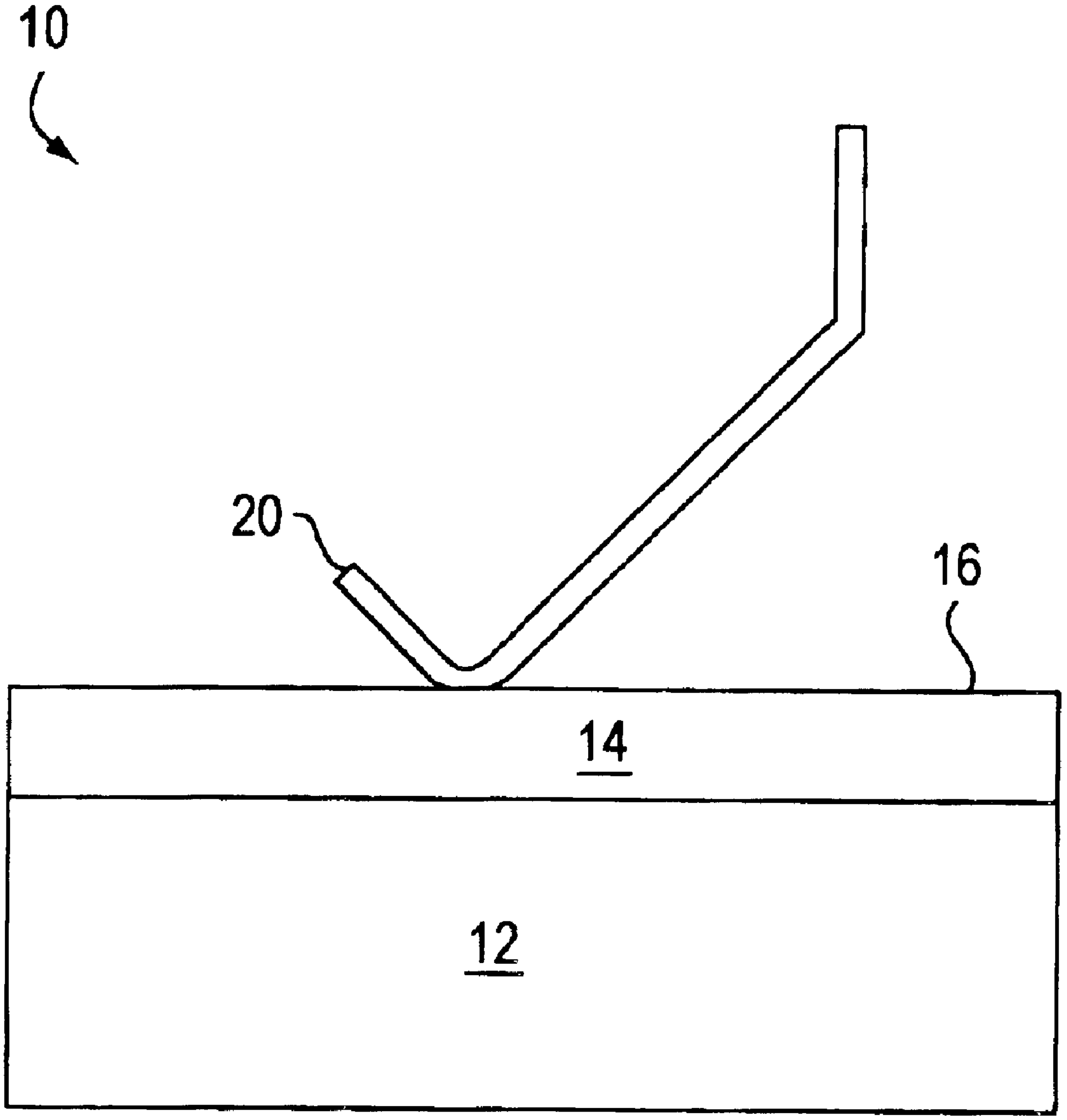
FIG. 1 shows a potentiometer of the present invention.

It is noted that the drawing is not to scale.

DETAILED DESCRIPTION OF THE PREFFERED EMBODIMENT(S)

According to a preferred embodiment of the invention, a resistive composition for screen printing onto a substrate will now be described. In particular, the composition includes polymer components, nanomaterials components, electrically conductive components and other additives. The composition is carried by an organic vehicle. The details of all these components, its method of preparation, associated printing procedures and resulting resistive film are discussed below.

Polymer Components

Polymers with functional groups capable of forming secondary bonding with the nanoparticles and nanofibers are preferred for these compositions. In addition to the functional groups, they should also have high glass transition temperature. It is critical for some high temperature applications such as in automobiles that these materials maintain a high storage modulus during the use and lifetime of the materials. The polymer components used in the present invention comprise 5–30 wt. % of a high Tg polymer selected from polyimides, polyamide imides, polysulfones, polyphenylenes, polyether sulfones, polyarylene ethers, polyphenylene sulfides, polyarylene ether ketones, phenoxy resins, polyether imides, polyquinoxalines, polyquinolines, polybenzimidazoles, polybenzoxazoles, polybenzothiazoles, phenolic, epoxy, diallyll isophthalate copolymers thereof, and mixtures thereof, based upon total composition. In addition to this polymer, 0–10% of another thermosetting polymer is sometimes used. The choice of the second polymer is dependent on the application. The second polymer can be selected from aromatic cyanate ester, epoxy, phenolic, diallyl isophthalate, bismaleimide, polyimide, etc. The polymers are dissolved in an organic solvent. The percentage compositions are based upon total composition.

In the electrically resistive composition of the present invention, the polymer component is used in the range of 10–30 wt. % by weight of the resistive composition, with a more preferred range of 15–20 wt. %. If less than 10 wt. % resin is used, the resulting resistive composition has poor screen printing properties as well as weak mechanical properties and poor adhesion. If more than 30 wt. % is used, the resulting composition has less electrical conductive properties.

An optional second polymer is sometimes added to increase the interfacial bonding between the nanomaterials and the matrix resin. The second polymer is preferably a high temperature thermosetting polymer and is used in the range of 0–10 wt. % Are used. The amount of this resin in the composition is determined by the application requirements. Increasing the amount of the second thermosetting polymer decreases flexibility, but improves temperature performance at high temperature. Depending on the amount of the second polymer, the cured film can either behave as a molecular composite, a semi-interpenetrating network, or an immiscible blend. This versatility in morphology can be judiciously chosen for a given application.

Nanomaterials Components

The mechanical and thermal properties of the resistive film can be increased by incorporating materials of nanodimensions in the resistive compositions. The nanoparticles and nanofibers of the present invention can be selected from carbon nanotubes, vapor grown carbon nanofibers, milled carbon fibers, molecular silica and nanoclays. Nanoparticles and nanofibers may be pretreated or preprocessed to obtain better dispersion of these materials. The particle size of these materials can be sometimes tailored for a given application. One of the methods to reduce and control particle size of vapor grown carbon fibers and milled carbon fibers is by milling them in a ball mill using a steel media. The medium for milling can be judiciously chosen to get very small particle size and to control particle size. The nanoparticles and nanofibers can be pretreated by using suitable materials in the milling medium. The medium for milling can also be monomers, oligomers, surface active agents, surface active chemicals, and solvents. The nanoparticles are used in the range of 0.025–20 wt % of the composition. A preferred range is 0.1–7 wt %.

Resistive nanocomposite compositions are polymer thick film compositions for which at least one dimension of the dispersed particles is in the nanometer range. Carbon nanotubes are strand-like fibers of parallel, individual single-walled carbon nanotubes (SWNT) that have a typical diameter in the range of 1–2 nanometers (nm). Vapor grown carbon fibers (VGCF) are highly crystalline fine carbon fiber synthesized by the vapor-phase method. VGCF are similar to fullerene tubes in the nanoscale domain of initial formation and the highly graphitic structure of the initial fibril. VGCF are produced as a mass of tangled fibers, each of which has a diameter of about 100 nanometers and a length ranging from 50 to 100 microns or longer. Milled carbon fibers are random short length fibers made from polyacrylonitrile (PAN) or pitch with a diameter of 5–8 $\mu$m and an average length of about 30 $\mu$m. The particle size of these fibers can be reduced to the submicron range by ball milling using steel media and suitable medium. The nanoclay particles are layered silicates where the layer thickness is around 1 nanometer and the lateral dimension of the layers varies from 0.3 nanometer to several microns. Molecular silica is derived from a class of chemicals known as polyhedral oligomeric silsesquioxanes (POSS) and polyhedral oligomeric silicates. POSS molecules are physically large with an approximate size range of 0.7 to 50 nm.

Electrically Conductive Component

The electrically conductive component of the present invention comprises finely divided particles of electrically conductive materials such as carbon black, graphite, silver, copper, nickel or mixtures thereof. This includes mixtures of the metallic and carbon powders. The preferred particles are carbon black. The preferred conductive particles comprise 1–25 wt. % of the conductive composition with a preferred range of 1–10 wt. %. The preferred carbon black is commercially available from Degusaa Corporation.

Other Additives

Antifriction additives such as fluoropolymers and graphite are used to decrease the friction between the resistive nanocomposite film surface and the sliding contact. The antifriction additives comprise 1–20 wt. % of the resistive composition with a preferred range of 5–10 wt. %. The preferred fluropolymer is commercially available from Dupont.

Wetting agents such as fluorinated oligomers may be added to the composition for wettability and leveling properties. Up to 1 wt. % of a fluorinated surfactant may be used. The fluorinated oligomers are commercially available from 3M Corporation.

Organic Vehicle

An organic solvent of 20–40 wt. % is used to dissolve the resistive composition. The preferred solvent is N-methyl pyrrolidone. The selection of the solvent is based on the good solubility of the polymer in this solvent. This solvent also has a high boiling point. Low evaporation of the solvent is preferred for continuous printing operation where no change in viscosity of the composition due to loss of solvent is desired. The polymer is dissolved completely in prior to blending with silver particles. N-methyl pyrrolidone is commercially available from BASF Corporation.

General Composition Preparation and Printing Procedures

In the preparation of an exemplary composition of the present invention, a polymer solution is made by mixing 10–20 wt. % of a polymer and 0–10 wt. % thermosetting resin in 60–80 wt. % N-methyl pyrrolidone based upon total composition. The polymer is mixed with both the conductive and nano-particles to form a paste with a fine particle size. At this point, surfactants and rheological additives may be added if desired to modify the properties of the resistive composition. The paste is mixed in a ball mill for several hours. Other methods of mixing could be used, such as employing high-speed shear to thoroughly blend the particles in the polymer binder. However, ball milling is preferred for preparing resistive composition with uniform particle size. The particle size range and viscosity of the paste is monitored to get a resistive paste suitable for application in position sensors. The milling time and milling quantity on the ball mill determines the final particle distribution, size and resulting rheology.

The resulting component sizes are as follows:

| Component | Size |
|---|---|
| Molecular silica | less than 100 nm |
| Nanoclay | less than 100 nm in one dimension |
| Carbon nanotubes | less than 100 nm in one dimension. |
| Vapor grown carbon nanofibers | between 50 nm to 10 micron in one dimension |
| Milled carbon fibers | between 100 nm to 10 micron in one dimension |

The resistive paste thus prepared is applied to substrates such as polyimide, ceramic and fiber reinforced phenolic substrates by conventional screen printing processes. A preferred substrate is polyimide. The wet film thickness typically used for position sensor applications is 30 to 60 microns. The wet film thickness is determined by the screen mesh and screen emulsion thickness. A preferred screen mesh of 250 is used for obtaining smooth resistive film on a polyimide substrate for position sensors. The paste is then dried and cured at a temperature between 200 C. and 300 C. in an air atmosphere oven for a time ranging from 30 minutes to 3 hours. This results in a resistive film being formed and bonded to the substrate.

Discussion

The present invention relates to an improved nanocomposite resistive composition and film that includes a polymeric resin and dispersed nanomaterials having conductive fillers, anti-friction additives. The dispersed nanomaterials are present in an amount less than 30% by weight of the cured nanocomposite films. The nanomaterials are selected from carbon nanotubes, vapor grown nanofibers, milled carbon fibers, nanoclays, and molecular silica.

The invention provides increased mechanical, wear, electrical, and thermal properties by incorporating nanomaterials into the resistive film. The large surface to volume ratio of the materials imparts significant interfacial strength to the composites. The functions of the nanoparticles and nanofibers are to increase the polymer-filler interactions. The large surface area of these nano materials significantly interacts with functional groups in the macromolecular chains. These interactions in the molecular and nanoscale increases the microhardness and nanohardness properties of these materials. These micro and nanohardness properties are very important for sliding contact applications. The homogeneity of the nanocomposite film increases the toughness and hardness uniformly. A resistor surface with molecularly dispersed fibers in nanodimensions or submicron dimensions can create an electrically and mechanically uniform surface. This gives a consistent and durable electrical output. The molecular silica and nanoclay provides increased thermal properties. The carbon fibrils provide increased electrical and mechanical properties. A composition containing carbon nanofibers and molecular silica materials provide enhanced wear resistance, enhanced thermal properties, and enhanced electrical properties.

The invention provides a decrease in contactor wear by avoiding the use of large carbon fibers or by using very small concentration of very finely milled carbon fibers in conjunction with nanoparticles and nanofibers.

The invention creates a resistor surface with a uniform electrical and mechanical surface on a nanoscale. During a high frequency small stroke dither test, the contactor will always be sliding on a mechanically tough nanocomposite surface. In contrast, the high frequency small stroke dither test on a prior art film can gouge and pit the resistor surface where the carbon fibers are absent.

The invention decreases the coefficient of thermal expansion of the resistor material. Wear of the resistor material is significantly increased at high temperature. One reason for this is the increased expansion of the material. By incorporating molecular silica, nanoclay, and nanofibers, a molecular scale interaction with the polymer matrix is achieved. These strong interactions on a nanoscale decrease the CTE of the material. In contrast, significantly large amount of large carbon fibers need to be added to decrease the thermal expansion. As mentioned earlier a large amount of large carbon fibers can significantly wear the metallic contactor.

The invention uses high glass transition temperature polymers, which form secondary bonding with the nanomaterials. The polymer matrix resin is selected from any high performance thermoplastic or thermosetting resins. The functional groups in the polymers should have good interaction with the nanoparticles. Polyimide, polyamideimide, phenolic, diallyl isophthalate (DAIP), Epoxy, Bismaleimide, etc can be used.

EXAMPLES

The present invention will be described in further detail by giving practical examples. The scope of the present invention, however, is not limited in any way by these practical examples.

All component concentrations are expressed as percentage by weight.

Example 1

This example describes the preparation of a resistive nanocomposite film using a resistive nanocomposite composition containing vapor grown carbon fibers. The components below were added to a 50-ml jar and mixed. The mixture was then milled in a ball mill for several hours. The resistive paste is then screen printed on alumina and polyimide substrates, dried and cured. A potentiometer was assembled using these substrates containing the film. The electrical and mechanical properties of the resistive film are then measured.

| Component | Weight (%) |
|---|---|
| Polyamide imide | 20.0 |
| Carbon black | 5.0 |
| Vapor grown carbon fiber | 5.0 |
| N-methyl pyrrolidone | 70 |

Example 2

This example describes the preparation of a resistive nanocomposite film using a resistive nanocomposite composition containing a mixture of vapor grown carbon fibers and milled carbon fibers. The components below were added to a 50-ml jar and mixed. The mixture was then milled in a ball mill for several hours. The resistive paste is then screen printed on alumina and polyimide substrates, dried and cured. A potentiometer was assembled using these substrates with the resistive film. The electrical and mechanical properties of the resistive film are then measured.

| Component | Weight (%) |
|---|---|
| Polyamide imide | 20.2 |
| Carbon black | 4.9 |
| Vapor grown carbon fiber | 4.9 |
| Milled carbon fiber | 0.7 |
| N-methyl pyrrolidone | 69.3 |

Example 3

This example describes the preparation of a resistive nanocomposite film using a resistive nanocomposite composition containing molecular silica particles. The components below were added to 50-ml jar and mixed. The mixture was then milled in a ball mill for several hours. The resistive paste is then screen printed on alumina and polyimide substrates, dried and cured. A potentiometer was assembled using these substrates. The electrical and mechanical properties of the resistive film are then measured.

| Component | Weight (%) |
|---|---|
| Polyamide imide | 20.0 |
| Carbon black | 5.0 |
| Molecular Silica | 5.0 |
| N-methyl pyrrolidone | 70 |

Example 4

This example describes the preparation of a resistive nanocomposite film using a resistive nanocomposite composition containing nanoclay particles. The components below were added to a 50-ml jar and mixed. The mixture was then milled in a ball mill for several hours. The resistive paste is then screen printed on alumina and polyimide substrates, dried and cured. A potentiometer was assembled using these substrates containing the nanocomposite film. The electrical and mechanical properties of the resistive film are then measured.

| Component | Weight (%) |
|---|---|
| Polyamide imide | 20.0 |
| Carbon black | 5.0 |
| Nanoclay | 5.0 |
| N-methyl pyrrolidone | 70 |

Example 5

This example describes the preparation of a resistive nanocomposite film using a resistive nanocomposite composition containing a mixture of molecular silica particles and milled carbon fibers. The components below were added to a 50-ml jar and mixed. The mixture was then milled in a ball mill for several hours. The resistive paste is then screen printed on alumina and polyimide substrates, dried and cured. A potentiometer was assembled using these substrates. The electrical and mechanical properties of the resistive film are then measured.

| Component | Weight (%) |
|---|---|
| Polyamide imide | 20.7 |
| Carbon black | 5.1 |
| Molecular silica | 2.5 |
| Milled carbon fiber | 0.7 |
| N-methyl pyrrolidone | 71.0 |

Example 6

This example describes the preparation of a resistive nanocomposite film using a resistive nanocomposite composition containing a mixture of nanoclay particles and milled carbon fibers. The components below were added to a 50-ml jar and mixed. The mixture was then milled in a ball mill for several hours. The resistive paste is then screen printed on alumina and polyimide substrates, dried and cured. A potentiometer was assembled using these substrates. The electrical and mechanical properties of the resistive film are then measured.

| Component | Weight (%) |
|---|---|
| Polyamide imide | 20.7 |
| Carbon black | 5.1 |
| Nanoclay | 2.5 |
| Milled carbon fiber | 0.7 |
| N-methyl pyrrolidone | 71.0 |

Example 7

This example describes the preparation of a resistive nanocomposite film using a resistive nanocomposite composition containing a carbon nanotubes. The components below were added to 50-ml jar and mixed. The mixture was then milled in a ball mill for several hours. The resistive paste is then screen printed on alumina and polyimide substrates, dried and cured. A potentiometer was assembled using these substrates. The electrical and mechanical properties of the resistive film are then measured.

| Component | Weight (%) |
|---|---|
| Polyamide imide | 17.36 |
| Carbon black | 7.92 |
| Carbon nanotubes | 6.25 |
| Graphite | 4.77 |
| Wetting agent | 0.17 |
| N-methyl pyrrolidone | 63.53 |

Example 8

This example describes the preparation of a resistive nanocomposite film using a resistive nanocomposite composition containing a mixture of molecular silica particles and carbon nanotubes. The components below were added to 50 ml jar and mixed. The mixture was then milled in a ball mill for several hours. The resistive paste is then screen printed on alumina and polyimide substrates, dried and cured. A potentiometer was assembled using these substrates. The electrical and mechanical properties of the resistive film are then measured.

| Component | Weight (%) |
|---|---|
| Polyamide imide | 18.0 |
| Carbon black | 5.0 |
| Carbon nanotubes | 3.0 |
| Molecular Sililca | 2.0 |
| N-methyl pyrrolidone | 72.0 |

Example 9

This example describes the preparation of a resistive nanocomposite film using a resistive nanocomposite composition containing a mixture of carbon nanotubes and milled carbon fibers. The components below were added to 50 ml jar and mixed. The mixture was then milled in a ball mill for several hours. The resistive paste is then screen printed on alumina and polyimide substrates, dried and cured. A potentiometer was assembled using these substrates. The electrical and mechanical properties of the resistive film are then measured.

| Component | Weight (%) |
|---|---|
| Polyamide imide | 18.0 |
| Carbon black | 5.0 |
| Carbon nanotubes | 3.0 |
| Milled carbon fiber | 2.0 |
| N-methyl pyrrolidone | 72.0 |

Example 10

This example describes the preparation of a resistive nanocomposite film using a resistive nanocomposite composition containing a mixture of vapor grown carbon fibers and milled carbon fibers. The components below were added to a 50 ml jar and mixed. The mixture was then milled in a ball mill for several hours. The resistive paste is then screen printed on alumina and polyimide substrates, dried and cured. A potentiometer was assembled using these substrates. The electrical and mechanical properties of the resistive film are then measured.

| Component | Weight (%) |
|---|---|
| Polyamide imide | 17.16 |
| Carbon black | 4.35 |
| Graphite | 6.61 |
| Vapor grown carbon nanofiber | 4.47 |
| Milled carbon fiber | 1.0 |
| Diallyl isopthalate | 1.0 |
| N-methyl pyrrolidone | 65.4 |

Example 11

This example describes the preparation of a resistive nanocomposite film using a resistive nanocomposite composition containing a mixture of nanoclay particles and vapor grown carbon fibers. The components below were added to 50 ml jar and mixed. The mixture was then milled in a ball mill for several hours. The resistive paste is then screen printed on alumina and polyimide substrates, dried and cured. A potentiometer was assembled using these substrates. The electrical and mechanical properties of the resistive film are then measured.

| Component | Weight (%) |
|---|---|
| Polyimide | 19.3 |
| Carbon black | 6.7 |
| Vapor grown carbon nanofiber | 6.0 |
| Nanoclay | 4.3 |
| N-methyl pyrrolidone | 63.6 |

Example 12

This example describes the preparation of a resistive nanocomposite film using a resistive nanocomposite composition containing carbon nanotubes and polytetrafluroethylene (PTFE). The components below were added to 50-ml jar and mixed. The mixture was then milled in a ball mill for several hours. The resistive paste is then screen printed on alumina and polyimide substrates, dried and cured. A potentiometer was assembled using these substrates. The electrical and mechanical properties of the resistive film are then measured.

| Component | Weight (%) |
|---|---|
| Polyamide imide | 17.36 |
| Carbon black | 7.92 |
| Carbon nanotubes | 6.25 |
| PTFE | 4.77 |
| Wetting agent | 0.17 |
| N-methyl pyrrolidone | 63.53 |

Materials Sources ps

Polyamideimide can be obtained from Amoco Corp.
Polyimide can be obtained from Dupont Corp.
Phenolic can be obtained from Borden chemicals Corp.
Diallylyl isopthalate can be obtained from DAISO Corp.
Aromatic cyanate ester can be obtained from Lonza Corp.
Carbon Nanotubes can be obtained from Carbolex Corp.
Vapor grown carbon nano fibers can be obtained from Applied Sciences Corp.
Milled carbon fibers can be obtained from Zoltech Corp.
Graphite can be obtained from Degusaa Corp.
Carbon black can be obtained from Degusaa Corp.
Wetting agent can be obtained from 3M Corp.
PTFE can be obtained from Dupont Corp.

Resistive Film

After the resistive composition of the present invention has been applied to a substrate and cured, a resistive film results. The film can be used in a potentiometer. Referring to FIG. 1, a potentiometer 10 is shown. Potentiometer 10 has a substrate 12 with a resistive film 14. Resistive film 14 has an upper surface 16. Film 14 is typically 10 to 20 microns in thickness. A wiper 20 is in mechanical and electrical contact with film 14 on surface 16. Wiper 20 mechanically moves across surface 16. When a voltage is applied across the resistive film 14 and measured at the wiper 20, the voltage varies according to the position of the wiper on the film due to the resistance change. The resistive compositions of examples 1–11 that were previously described have the following material compositions after curing into a resistive film:

TABLE 1

| Examples | polymer | Carbon black | Vapor grown carbon fibers | Milled carbon fibers | Molecular silica | Nano Clay | Carbon Nano-tubes | Thermo Set Resin | Graphite | Wetting agent | PTFE |
|---|---|---|---|---|---|---|---|---|---|---|---|
| Example 1 | 66.67 | 16.67 | 16.67 | | | | | | | | |
| Example 2 | 65.8 | 15.96 | 15.96 | 2.28 | | | | | | | |

TABLE 1-continued

| Examples | polymer | Carbon black | Vapor grown carbon fibers | Milled carbon fibers | Molecular silica | Nano Clay | Carbon Nano-tubes | Thermo Set Resin | Graphite | Wetting agent | PTFE |
|---|---|---|---|---|---|---|---|---|---|---|---|
| Example 3 | 66.67 | 16.67 | | | 16.67 | | | | | | |
| Example 4 | 66.67 | 16.67 | | | | 16.67 | | | | | |
| Example 5 | 71.38 | 17.59 | | 2.41 | 8.62 | | | | | | |
| Example 6 | 71.38 | 17.59 | | 2.41 | | 8.62 | | | | | |
| Example 7 | 47.6 | 21.72 | | | | | 17.14 | | 13.08 | 0.47 | |
| Example 8 | 64.29 | 17.86 | | | 7.14 | | 10.71 | | | | |
| Example 9 | 64.29 | 17.86 | | 7.14 | | | 10.71 | | | | |
| Example 10 | 49.61 | 12.58 | 12.92 | 2.89 | | | | 2.89 | 19.11 | | |
| Example 11 | 53.17 | 18.46 | 16.53 | | | 11.85 | | | | | |
| Example 12 | 47.6 | 21.72 | | | | | 17.14 | | | 0.47 | 13.08 |

The resistive film has a composition of 40–75 percent by weight of cured polymer resin, 1–5 percent by weight of cured thermosetting resin, 10–35 percent by weight of conductive particles, 0.025–20 percent by weight of carbon nanoparticles, 0–20.0 percent by weight of PTFE, 5–20 percent by weight of molecular silica and 5–20 percent by weight of nanoclay. The carbon nanoparticles reduce wear between the wiper and the film as the wiper moves across the film.

Electrical Testing

The films resulting from the compositions of the present invention were tested for electromechanical wear properties. A palladium metal wiper was moved repeatedly back and forth across the film to simulate the motion as used in a potentiometer. After 2 million cycles of wiping at −40 C. to 135 C. temperature, the test samples were measured for peak correlation output noise. In the test, two films or tracks were measured. The electrical output from two resistive tracks on the substrate were measured and correlated to determine a correlation output noise.

Correlation output noise is given by:

$$C = \left(\frac{V_a}{V_{app}} + \frac{V_b}{V_{app}}\right) - \left(\frac{V_{\text{a\_index}}}{V_{app}} + \frac{V_{\text{b\_index}}}{V_{app}}\right)$$

Where:

C is the correlation.

$V_a$ and $V_b$ are the output voltage of the Track A and Track B, respectively.

$V_{app}$ is the applied voltage.

$V_{a\_index}$ and $V_{b\_index}$ are the output voltage of the Track A and Track B, respectively, at a low-end mechanical stop as provided by the test system.

The wear area was measured by a Tencor P-10 surface profilometer and the wear scar area was examined visually using an optical microscope. Wear ratings are given by combining both observations. Wear results are shown in table 2.

Table 2: Electrical and Wear Properties of Position Sensing Elements Prepared From the Compositions

| Examples | Peak correlation output noise (%) | Wear Rating (1 = best, 10 = worst) |
|---|---|---|
| Prior Art | 56.75 | 7 |
| Example 1 | 7.74 | 3 |
| Example 2 | 1.71 | 1 |

Table 3 shows a comparison chart of the coefficient of thermal expansion (CTE) values for several example compositions as compared to the prior art. A lower value of CTE correlates with improved wear properties of the resistive film. CTE values are shown for above and below the glass transition temperature (Tg).

Table 3: CTE Properties of Resistive Nanocomposite Films Containing Nanomaterials

| Examples | CTE below Tg (ppm/C) | CTE above Tg (ppm/C) |
|---|---|---|
| Prior art | 42 | 1002 |
| Example 1 | 27 | 288 |
| Example 2 | 21 | — |
| Example 3 | 36 | 108 |
| Example 4 | 23 | 95 |

It is noted that the wear properties of the films prepared using the composition of the present invention are greatly improved over the prior art. In addition, the measured peak correlation output noise is greatly reduced. The CTE of the resistive films of the present invention are also significantly reduced compared to resistive films of prior art While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A resistive film for use in a potentiometer, the film being contacted by a movable wiper, the film comprising:

a) a cured polymer resin;

b) a plurality of conductive particles selected from the group consisting of carbon black, graphite and mixtures thereof, the conductive particles causing the resins to be electrically conductive; and c) a plurality of nanoparticles, the nanoparticles increasing wear resistance and reducing electrical noise of the resistive film, wherein the nanoparticles are chosen from the group consisting of carbon nanotubes, carbon nanofibers, vapor grown carbon fibers, milled carbon fibers, nanoclay, molecular silica and mixtures thereof.

2. The resistive film of claim 1 wherein the cured polymer resin makes up 40–75 percent by weight of the resistive film.

3. The resistive film of claim 1 further comprising a cured thermosetting resin.

4. The resistive film of claim 3 wherein the cured thermosetting resin makes up 1–5 percent by weight of the resistive film.

5. The resistive film of claim 1 wherein the conductive particles make up 10–35 percent by weight of the resistive film.

6. The resistive film of claim 1 wherein the nanoparticles make up 0.025–20 percent by weight of the resistive film.

7. The resistive film of claim 6 wherein the nanoparticles are 1–5 percent by weight of the total composition.

8. The resistive film of claim 1 wherein the cured polymer resin is chosen from the group consisting of polyimides, polyamide imides, polysulfones, polyphenylenes, polyether sulfones, polyarylene ethers, polyphenylene sulfides, polyarylene ether ketones, phenoxy resins, polyether imides, polyquinoxalines, polyquinolines, polybenzimidazoles, polybenzoxazoles, polybenzothiazoles, phenolic, epoxy and diallyll isophthalate.

9. The resistive film of claim 4 wherein the thermosetting resin is chosen from the group consisting of aromatic cyanate ester, epoxy, phenolic, diallyl isophthalate and bismaleimide.

10. The resistive film according to claim 1, wherein the resistive film is disposed on a substrate, the substrate chosen from the group consisting of polyimide, ceramic and fiber reinforced phenolic.

11. The resistive film according to claim 1, wherein the carbon nanotubes have a particle size less than 100 nanometers in one dimension.

12. The resistive film according to claim 1, wherein the vapor grown carbon nanofibers have a particle size range of 50 nanometers to 10 microns in one dimension.

13. The resistive film according to claim 1, wherein the milled carbon fibers have a particle size range of 100 nanometers to 10 micron in one dimension.

* * * * *